United States Patent [19]
Godau et al.

[11] Patent Number: 5,781,125
[45] Date of Patent: Jul. 14, 1998

[54] ARRANGEMENT FOR THE WIRELESS EXCHANGE OF DATA BETWEEN A SERVICING DEVICE AND A CONTROL UNIT IN A MOTOR VEHICLE

[75] Inventors: Ralf Godau, Puchheim; Eberhard Dammann, Baldham; Fritz Penzenstadler, Moosinning, all of Germany

[73] Assignee: Bayerische Motoren Werke Aktiengesellschaft, Munich, Germany

[21] Appl. No.: 694,413

[22] Filed: Aug. 12, 1996

[30] Foreign Application Priority Data

Aug. 12, 1995 [DE] Germany ............ 195 29 741.5

[51] Int. Cl.⁶ .................. G08C 17/00; G08C 19/16
[52] U.S. Cl. .................. 340/870.01; 340/425.1; 340/635; 340/825.72; 701/29; 701/33
[58] Field of Search .......... 340/825.69, 825.72, 340/870.01, 425.1, 635, 438; 364/424.034, 424.038, 424.039; 701/35, 36

[56] References Cited

U.S. PATENT DOCUMENTS

| | | | |
|---|---|---|---|
| 3,813,632 | 5/1974 | Drewry | 339/154 A |
| 4,989,146 | 1/1991 | Imajo | 340/635 |
| 5,003,477 | 3/1991 | Abe et al. | 364/424.038 |
| 5,157,610 | 10/1992 | Asano et al. | 364/424.038 |
| 5,309,351 | 5/1994 | McCain et al. | 364/132 |
| 5,345,384 | 9/1994 | Przybyla et al. | 364/424.04 |
| 5,396,422 | 3/1995 | Forchert et al. | 364/424.03 |
| 5,491,418 | 2/1996 | Alfaro et al. | 364/424.034 |

FOREIGN PATENT DOCUMENTS

| | | |
|---|---|---|
| 30 01 331 | 7/1981 | Germany. |
| 33 33 333 | 3/1985 | Germany. |
| 35 38 687 | 5/1987 | Germany. |
| 39 11 916 | 5/1990 | Germany. |
| 39 36 988 | 5/1991 | Germany. |
| 41 18 486 | 12/1992 | Germany. |
| 43 34 859 | 12/1994 | Germany. |
| 43 28 393 | 3/1995 | Germany. |
| 44 35 484 | 4/1995 | Germany. |
| 44 19 189 | 12/1995 | Germany. |
| 195 22 937 | 1/1997 | Germany. |

OTHER PUBLICATIONS

*Elektronik* 14/7.7.1989 entitled "Kfz–Tester mit drahtloser Messwertaufnahme" by D. Dreyer, pp. 78–80.

*Primary Examiner*—Michael Horabik
*Assistant Examiner*—Timothy Edwards, Jr.
*Attorney, Agent, or Firm*—Evenson, McKeown, Edwards & Lenahan, P.L.L.C.

[57] ABSTRACT

In the case of an arrangement for the wireless exchange of data between a servicing device and a control unit in a motor vehicle, having a transmission path between the servicing device and a transmitting and receiving device (SEE) on the motor vehicle, the transmitting and receiving device is arranged on the motor vehicle in a removable manner.

8 Claims, 3 Drawing Sheets

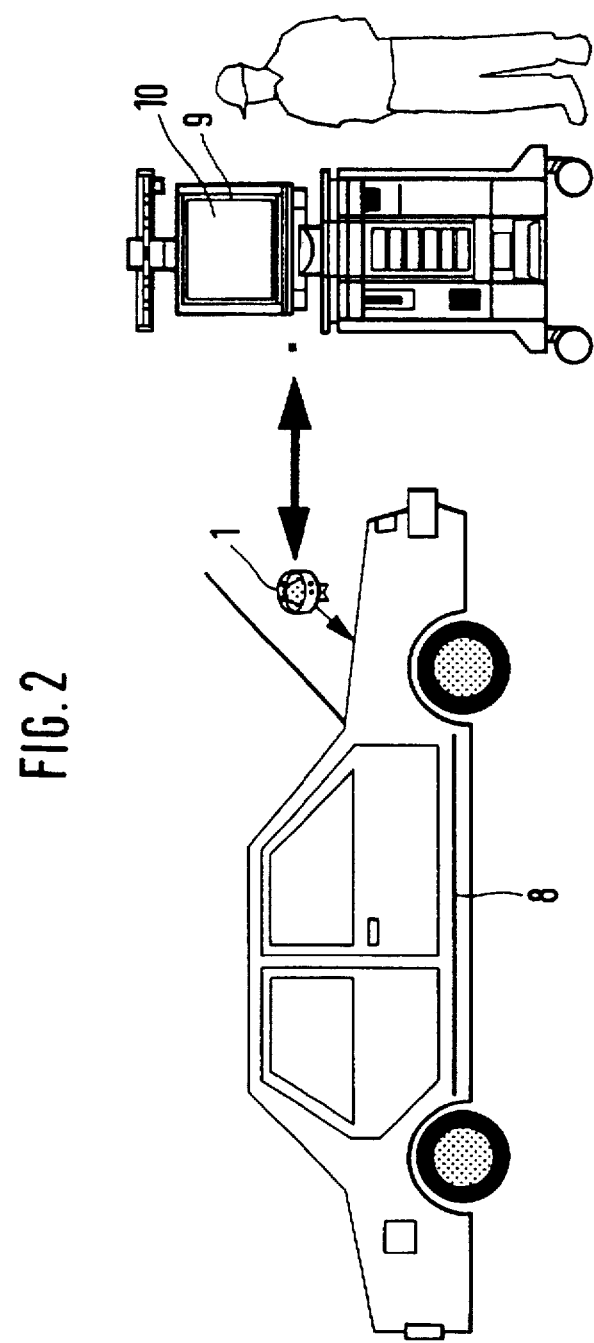

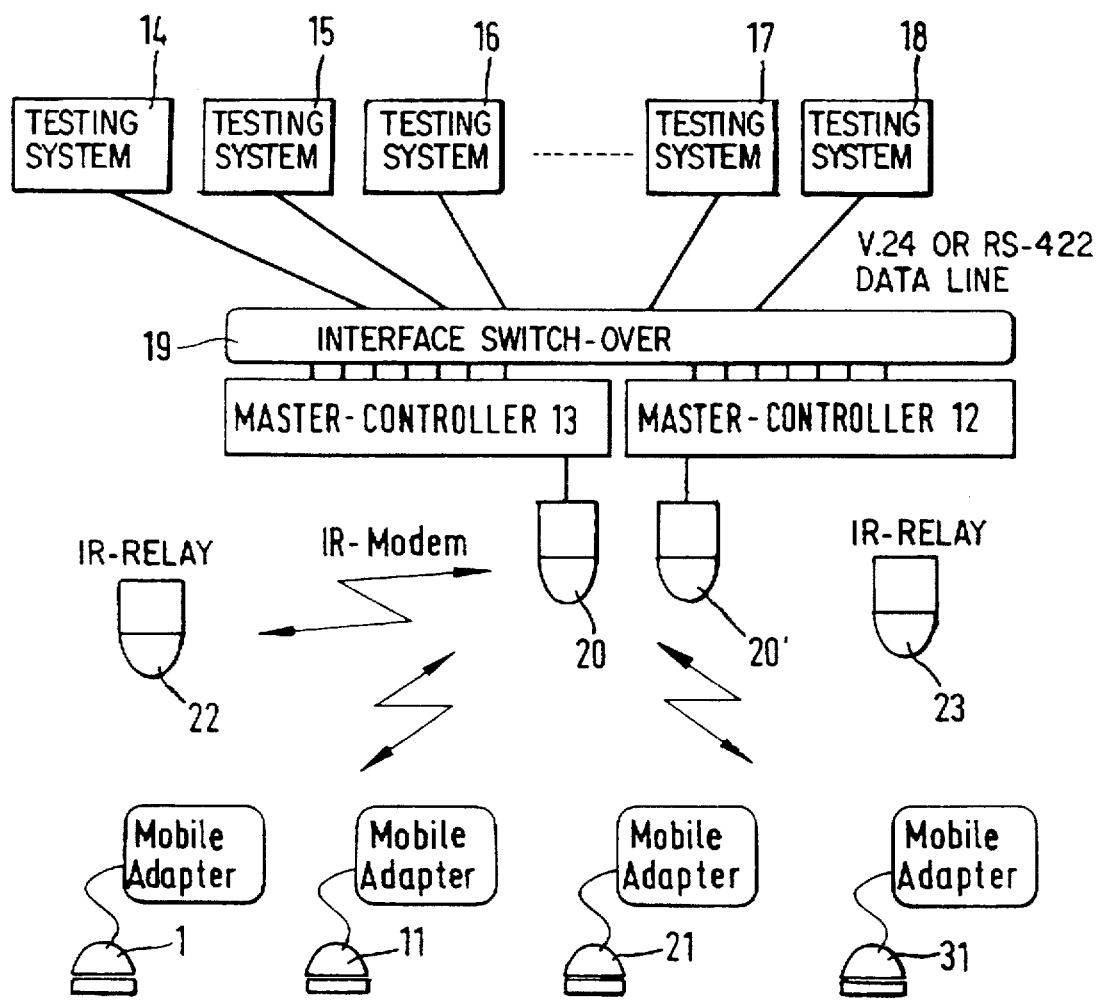

ARRANGEMENT FOR THE WIRELESS EXCHANGE OF DATA BETWEEN A SERVICING DEVICE AND A CONTROL UNIT IN A MOTOR VEHICLE

BACKGROUND AND SUMMARY OF THE INVENTION

This invention relates to an arrangement for the wireless exchange of data between a servicing device and a control unit in a motor vehicle, having a transmission path between the servicing device and a transmitting and receiving device (SEE) on the motor vehicle.

In the case of such an arrangement known from German Patent document DE 43 34 859 A1, the exchange of data is used for testing and/or programming the control unit or units. The use of the arrangement takes place within the scope of vehicle manufacturing on the production line and in servicing shops. The exchange of the data takes place by radio or by way of an infrared transmission path. A device normally existing in the motor vehicle is used as a transmitting and receiving unit (SEE). In the normal operation, it is used, for example, within the scope of a remote control, that is, of an access control device operating as a result of the exchange of question/answer signals.

Although, at first glance, the known arrangement has a simple construction at reasonable cost, it requires that each motor vehicle, which is to be tested or programmed, be provided with such a transmitting and receiving device. It is also a prerequisite that different model series are provided with an at least comparable transmitting and receiving device. This is also not the case in practice because access control devices of the same manufacturer are used on a radio or infrared basis. If it is necessary to test and/or program in this manner also motor vehicles which have been driven for some time, additional problems occur because frequently the required equipment is not available specifically in motor vehicles of this type. In addition, the data transmission rate of the remote control is much too low for the data quantities required for the programming of the control units.

There is therefore needed an arrangement of the above-mentioned type which can be universally used in the case of all motor vehicles, possibly also for several manufacturers.

These needs are met according to the present invention by an arrangement for the wireless exchange of data between a servicing device and a control unit in a motor vehicle, having a transmission path between the servicing device and a transmitting and receiving device (SEE) on the motor vehicle. The transmitting and receiving device is arranged on the motor vehicle in a removable manner.

The removable transmitting and receiving device is suitable for the requirements and the technical circumstances of the servicing device, for example, for a high data transmission rate. In contrast, in the case of the known arrangement, an adaptation of the servicing device to the usually different transmitting and receiving devices of the motor vehicles is required. The prerequisite for the effectiveness of the transmitting and receiving device is only an electric connection to the control unit or units in the motor vehicle. This connection may preferably take place by way of the current on-board circuits of the motor vehicle. The transmitting and receiving device itself can be connected to the current circuits, for example, instead of the cigar lighter.

In contrast, it is advantageous to provide the transmitting and receiving device with an electric plug by which it can be placed in a contact-generating manner on a diagnostic connector of the motor vehicle. As a rule, such a connector exists in every motor vehicle. Since these connectors are standardized within the framework of the automobile industry or at the respective manufacturer, this easily results in a universal usability. The energy supply of the transmitting and receiving devices will then also take place by way of the connector.

The wireless exchange of data may lead to problems when several servicing devices are operated side-by-side and communicate with several transmitting and receiving devices for several motor vehicles. In this case, the data can most easily be differentiated from one another in that they are provided as data telegrams with an identification code. This ensures that each servicing device exchanges data only with "its" assigned transmitting and receiving device or, in the case of a single servicing device, this servicing device communicates with the respective correct transmitting and receiving device.

As mentioned above, the invention can be used within the scope of a servicing shop or within the framework of the manufacturing of the motor vehicle. For use in manufacturing, it is advantageous to arrange several, servicing devices in a field which are capable of communicating with one or several transmitting and receiving devices. In contrast to the above-mentioned 1:1 assignment, this assignment can be variable. Thus it is possible to arrange the servicing devices in a field in which a section, or the complete assembly line, extends. The servicing devices can then communicate successively with the same transmitting and receiving device of the motor vehicle which happens to be in its transmitting and receiving range. If the motor vehicle leaves this range, it is "transferred" to a spatially next servicing device which will then exchange data with the transmitting and receiving device. The previously operative servicing device will then take over the data exchange with the transmitting and receiving device of the motor vehicle which follows on the assembly line.

By means of the successive exchange of data with several servicing devices, it is possible to program a motor vehicle successively during manufacturing. Several control units can be programmed successively. It is also possible to read out and erase defect memories of control units. Entries into the defect memories are usually the result of temporary fault conditions, for example, sensors, current connections, etc. which are not yet installed or activated. Likewise, it is possible to relatively rapidly recognize a possible faulty assembly and to still eliminate it during the assembly process. Also, the data of a motor vehicle received by the individual servicing devices can be collected and evaluated during the final inspection. Still existing faulty conditions can then be differentiated from defects which were eliminated in the interim and a finishing operation can be carried out according to the requirements.

The goal of a high data transmission rate can be achieved by means of an alternative embodiment of an arrangement for the wireless exchange of data between a servicing device and a control unit in a motor vehicle, having a transmission path between the servicing device and a transmitting and receiving device (SEE) on the motor vehicle. The servicing device is arranged on the motor vehicle in a removable manner and, by means of an adapted transmitting and receiving device SEE on the motor vehicle, transmits data along a short distance. The transmitting and receiving device is not visible from the outside but is fastened so that it remains protected.

The fastening of the servicing device, which may be connected with a central office by a cable or in a wireless manner, takes place, for example, via a suction cup. The transmitting and receiving device can be housed in a rear vehicle light. The data transmission can then take place in the manner of an IRDA interface.

Other objects, advantages and novel features of the present invention will become apparent from the following detailed description of the invention when considered in conjunction with the accompanying drawings.

BRIEF DESCRIPTION OF THE DRAWINGS

FIG. 2 is an illustrative view of the use of the transmitting and receiving unit in a servicing shop; and FIG. 3 is a block diagram illustrating the use of the transmitting and receiving device within the framework of the vehicle assembly.

DETAILED DESCRIPTION OF THE DRAWINGS

Figure 1:
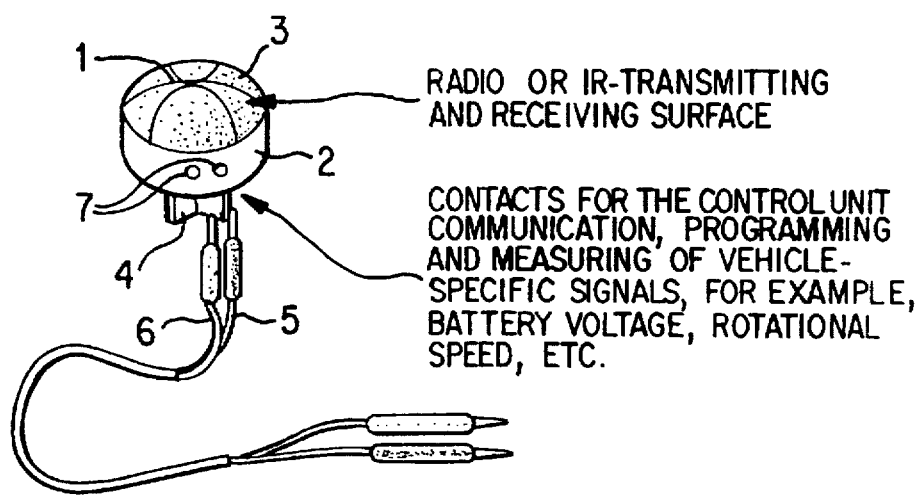
FIG. 1 is an illustrative view of a mobile transmitting and receiving device (SEE) which can be arranged on a motor vehicle in a removable manner.

The transmitting and receiving unit SEE 1 illustrated in FIG. 1 contains testing and communicating circuits (not shown) in a housing 2. A radio or infrared transmitting and receiving surface 3 is part of a radio or infrared transmission path to a servicing device (compare FIG. 2 and 3). In addition, on the bottom of the housing 2, a plug 4 is arranged which contains several contactors and can be plugged in a contact-generating manner into a diagnostic contactor in the engine compartment of a motor vehicle (FIG. 2). By way of this contactor, the module 1 is supplied with current.

The module 1 is used for the serial communication between the servicing device and the control units (not shown) installed in the motor vehicle and for measuring vehicle-specific signals. The transmission between the module 1 and the servicing device takes place in a wireless manner. For exceptional cases, an additional connection can be established by way of a cable 5 in order to ensure, in the case of possible shadow effects, for example, when the engine hood is closed, a proper data exchange while the module 1 is fitted on the vehicle.

The measuring of the vehicle-specific signals takes place directly by way of the diagnostic contactor in the engine compartment. Signals which are not applied to the diagnostic contactor can be tapped by a separate measuring cable 6 and supplied to the module 1 by way of a bush 7. The data obtained in this manner are transmitted to the servicing device by way of the transmitting and receiving surface 3. Correspondingly, it is also possible to transmit data from the servicing device to the module 1 in order to, for example, carry out program changes of the individual control units. These data are fed into the control units on the same path as that provided for the reading of the data out of the control units.

FIG. 2 illustrates the use of the module 1 in a shop. The module 1 is disposed on the diagnostic contactor of the motor vehicle 8 which is not shown in detail and establishes a radio or infrared connection to a servicing device 9 in a wireless manner. The device 9 is connected with a corresponding transmitting and receiving device and permits the displaying of data of the motor vehicle on a video screen 10. These data are transmitted from the module 1 to the device 9. Inversely, data, for example, in the form of characteristic curves and program steps and the like, can be fed from the devices 9 by way of the module 1 into the motor vehicle 8 and as a result, control units can be provided with correspondingly different contents.

As a supplement or an alternative to the servicing device 9, a communication connection can also be established by way of the module 1 to the transmitting and receiving device which is connected with an in-house data network. By way of the network, a repair accepting party can communicate with the motor vehicle and prepare a repair order on the basis of defect data. Likewise, it is possible to exchange data with the manufacturer connected to the network and to carry out updates of the control units, defect statistics, etc.

FIG. 3 schematically illustrates the use of several modules 1 during manufacturing of vehicles. The modules have the reference numbers 1, 11, 21 and 31 and are situated in or on motor vehicles which are not shown in detail and which are travelling through an assembly line (also not shown). Master controller 12 and a second master controller 13, which have a redundancy function, correspond in their method of operation to the servicing device 9 of FIG. 2. These are connected with testing systems 14–18 not shown in detail by way of an interface switchover 19 which services by way of a single infrared modem 20 and 20' with transmitting and receiving functions all used modules, here 1, 11, 21 and 31. In addition, relay stations 22 and 23 are arranged which also contain an infrared transmitting and receiving part and which operate as optical relay stations. The relays 22 and 23 can be connected with one another also by way of an electric line in order to bridge optical obstacles, such as a partition.

The interface changeover 19 and the connection of the testing systems 14 to 18 can also be implemented alternatively by way of a local network.

The use of the modules 1, 11, 21 and 31 takes place in the following manner. The modules are provided at an initializing station (not shown) as the first station in the manufacturing sequence. During the mounting on the vehicle, an initialization is carried out, that is, an assignment of the respective module and the concerned motor vehicle occurs. In this case, the master controller 12 and 13 is informed of the subscriber address of the module and of a vehicle control key of the just adapted vehicle. This key represents a clear recognition of a vehicle in the production line corresponding, for example, to the chassis number.

Subsequently, the vehicle moves through several testing stations which are each provided with a testing system 14 to 18. In each testing station, testing sequences are carried out which, in contrast to the previous wire-bound process, takes place in a wireless manner by way of an infrared transmission path from the modem 20 to the respective module, possibly while using relay stations 22 and/or 23. The master controller 12, 13 continuously addresses all defined subscriber addresses. Since not all modules are always installed on vehicles and not all modules are permanently required in testing sequences, an automatic prioritizing takes place in the master controller 12, 13: Subscribers which do not check in are set back and are then addressed only every second or every third time, etc. If a set-back subscriber replies to a job, it is immediately prioritized higher.

The module remains in the motor vehicle in the continued manufacturing sequence. At the end of the field, it is taken off and returned to the initialization station.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A wireless coupling device for different types of motor vehicles, comprising:

a universal transmitting and receiving device adapted to be removably mounted on, and operable with, said different types of motor vehicles;

wherein said universal transmitting and receiving device is electrically connected with at least one control unit in a particular motor vehicle when mounted thereon, said universal transmitting and receiving device wirelessly exchanging data from the at least one control unit via a transmission path with at least one servicing device; and wherein several servicing devices are arranged in a field and communicate with the transmitting and receiving device of a motor vehicle situated in the field.

2. Arrangement according to claim 1, wherein the servicing devices communicate with several transmitting and receiving devices which are connected with one motor vehicle respectively within the field.

3. Arrangement according to claim 2, wherein the servicing devices communicate successively with the several transmitting and receiving devices.

4. A wireless coupling device for different types of motor vehicles, comprising:

a universal transmitting and receiving device adapted to be removably mounted on, and operable with, said different types of motor vehicles; and wherein said universal transmitting and receiving device is electrically connected with at least one control unit in a particular motor vehicle when mounted thereon, said universal transmitting and receiving device wirelessly exchanging data from the at least one control unit via a transmission path with at least one servicing device.

5. Arrangement according to claim 4, wherein the transmitting and receiving device has an electric plug by which it can be placed in a contact-generating manner on a diagnostic contactor of the motor vehicle.

6. Arrangement according to claim 4, wherein said data exchanged by the transmitting and receiving device are constructed as a data telegram with an identification code.

7. An arrangement for different types of motor vehicles, comprising:

a universal servicing device adapted to be removably arranged on, and operable with, said different types of motor vehicles;

an adapted transmitting and receiving device arranged on said different types of motor vehicles;

wherein said adapted transmitting and receiving device is electrically connected with at least one control unit in a particular motor vehicle when mounted thereon, said adapted transmitting and receiving device wirelessly exchanging data over a short distance between said adapted transmitting and receiving device and said universal servicing device.

8. Arrangement according to claim 7, wherein the transmitting and receiving device is not visible from outside the vehicle and is fastened so that it remains protected.

* * * * *